(12) United States Patent
Horrocks et al.

(10) Patent No.: US 7,577,585 B2
(45) Date of Patent: Aug. 18, 2009

(54) METHOD AND SYSTEM FOR COMPLETING TRANSACTIONS INVOLVING PARTIAL SHIPMENTS

(75) Inventors: Darin Horrocks, Draper, UT (US); Hans D. Buehler, Williston, VT (US)

(73) Assignee: American Express Travel Related Services Company, Inc., New York, NY (US)

(*) Notice: Subject to any disclaimer, the term of this patent is extended or adjusted under 35 U.S.C. 154(b) by 1245 days.

(21) Appl. No.: 10/724,940

(22) Filed: Dec. 1, 2003

(65) Prior Publication Data
US 2005/0119942 A1 Jun. 2, 2005

Related U.S. Application Data

(63) Continuation-in-part of application No. 10/064,151, filed on Jun. 14, 2002, now Pat. No. 6,901,387.

(60) Provisional application No. 60/337,910, filed on Dec. 7, 2001.

(51) Int. Cl.
*G06Q 30/00* (2006.01)
(52) U.S. Cl. .......................... 705/26; 705/28
(58) Field of Classification Search ................ None
See application file for complete search history.

(56) References Cited

U.S. PATENT DOCUMENTS

| | | | |
|---|---|---|---|
| 3,719,927 A | 3/1973 | Michels et al | |
| 4,491,725 A | 1/1985 | Pritchard | |
| 4,594,663 A | 6/1986 | Nagata et al. | |
| 4,734,564 A | 3/1988 | Boston et al. | |
| 4,812,628 A | 3/1989 | Boston et al. | |
| 4,891,503 A | 1/1990 | Jewell | |
| 4,916,611 A | 4/1990 | Doyle, Jr. et al. | |
| 5,036,461 A | 7/1991 | Elliott et al. | |
| 5,070,452 A | 12/1991 | Doyle, Jr. et al. | |
| 5,210,687 A | 5/1993 | Wolfberg et al. | |
| 5,301,105 A | 4/1994 | Cummings, Jr. | |
| 5,621,201 A | 4/1997 | Langhans et al. | |
| 5,631,828 A | 5/1997 | Hagan | |
| 5,649,116 A | 7/1997 | McCoy et al. | |
| 5,708,422 A | 1/1998 | Blonder et al. | |
| 5,710,887 A | 1/1998 | Chelliah et al. | |
| 5,715,403 A | 2/1998 | Stefik | |

(Continued)

FOREIGN PATENT DOCUMENTS

EP 0072183 2/1983

(Continued)

OTHER PUBLICATIONS

Phillips, Stephen: "Case Study—Orbiscom and Cyota", Sep. 5, 2001, download from http://www.cyota.com/viewCyotaNews.cfm?id=41 on Apr. 24, 2002, © 2001, The Financial Times. 2pgs.

(Continued)

*Primary Examiner*—F. Zeender
*Assistant Examiner*—Christopher Buchanan
(74) *Attorney, Agent, or Firm*—Snell & Wilmer L.L.P.

(57) ABSTRACT

Embodiments provide systems, apparatus, methods, computer program code, and means for completing transactions involving partial shipments.

23 Claims, 2 Drawing Sheets

U.S. PATENT DOCUMENTS

| | | | |
|---|---|---|---|
| 5,724,324 A | 3/1998 | Gifford | |
| 5,724,424 A * | 3/1998 | Gifford | 705/79 |
| 5,732,400 A | 3/1998 | Mandler et al. | |
| 5,748,908 A | 5/1998 | Yu | |
| 5,757,917 A | 5/1998 | Rose et al. | |
| 5,758,327 A | 5/1998 | Gardner et al. | |
| 5,781,632 A | 7/1998 | Odom | |
| 5,790,677 A | 8/1998 | Fox et al. | |
| 5,797,133 A | 8/1998 | Jones et al. | |
| 5,798,508 A | 8/1998 | Walker et al. | |
| 5,822,737 A | 10/1998 | Ogram | |
| 5,825,881 A | 10/1998 | Colvin, Sr. | |
| 5,826,241 A | 10/1998 | Stein et al. | |
| 5,826,245 A | 10/1998 | Sandberg-Diment | |
| 5,832,447 A | 11/1998 | Rieker et al. | |
| 5,850,446 A | 12/1998 | Berger et al. | |
| 5,864,829 A | 1/1999 | Tago | |
| 5,883,810 A | 3/1999 | Franklin et al. | |
| 5,890,137 A | 3/1999 | Koreeda | |
| 5,914,472 A | 6/1999 | Foladare et al. | |
| 5,945,653 A | 8/1999 | Walker et al. | |
| 5,956,700 A | 9/1999 | Landry | |
| 5,991,750 A | 11/1999 | Watson | |
| 6,000,832 A | 12/1999 | Franklin et al. | |
| 6,006,205 A | 12/1999 | Loeb et al. | |
| 6,014,650 A | 1/2000 | Zampese | |
| 6,029,890 A | 2/2000 | Austin | |
| 6,052,675 A | 4/2000 | Checchio | |
| 6,128,603 A | 10/2000 | Dent et al. | |
| 6,163,771 A | 12/2000 | Walker et al. | |
| 6,169,974 B1 | 1/2001 | Baumgartner et al. | |
| 6,193,155 B1 | 2/2001 | Walker et al. | |
| 6,226,624 B1 | 5/2001 | Watson et al. | |
| 6,227,447 B1 | 5/2001 | Campisano | |
| 6,324,526 B1 | 11/2001 | D'Agostino | |
| 6,327,578 B1 * | 12/2001 | Linehan | 705/65 |
| 6,330,544 B1 | 12/2001 | Walker et al. | |
| 6,339,766 B1 | 1/2002 | Gephart | |
| 6,360,209 B1 | 3/2002 | Loeb et al. | |
| 6,453,296 B1 | 9/2002 | Iwamura | |
| 6,456,984 B1 | 9/2002 | Demoff et al. | |
| 6,493,685 B1 | 12/2002 | Ensel et al. | |
| 6,598,031 B1 | 7/2003 | Ice | |
| 6,636,933 B1 | 10/2003 | Flitcroft et al | |
| 6,748,367 B1 | 6/2004 | Lee | |
| 6,901,387 B2 | 5/2005 | Wells et al. | |
| 6,955,294 B1 | 10/2005 | Seegar | |
| 7,006,994 B1 | 2/2006 | Campbell et al. | |
| 7,117,172 B1 | 10/2006 | Black | |
| 2001/0007098 A1 | 7/2001 | Hinrichs et al. | |
| 2001/0011222 A1 | 8/2001 | Mclauchlin et al. | |
| 2001/0029473 A1 | 10/2001 | Yamaoka et al. | |
| 2001/0032192 A1 | 10/2001 | Putta et al. | |
| 2001/0034702 A1 | 10/2001 | Mockett et al. | |
| 2001/0034720 A1 | 10/2001 | Armes | |
| 2001/0037312 A1 | 11/2001 | Gray et al. | |
| 2001/0042784 A1 | 11/2001 | Fite et al. | |
| 2001/0047310 A1 | 11/2001 | Russell | |
| 2001/0047330 A1 | 11/2001 | Gephart et al. | |
| 2001/0047335 A1 | 11/2001 | Arndt et al. | |
| 2001/0047336 A1 | 11/2001 | Maycock, Jr. et al. | |
| 2001/0051917 A1 | 12/2001 | Bissonette et al. | |
| 2001/0051924 A1 | 12/2001 | Uberti | |
| 2002/0007320 A1 | 1/2002 | Hogan et al. | |
| 2002/0035548 A1 | 3/2002 | Hogan et al. | |
| 2002/0059146 A1 | 5/2002 | Keech | |
| 2002/0065774 A1 | 5/2002 | Young et al. | |
| 2002/0073045 A1 | 6/2002 | Rubin et al. | |
| 2002/0077977 A1 | 6/2002 | Neely et al. | |
| 2002/0191646 A1 | 7/2002 | Lake et al. | |
| 2002/0116327 A1 | 8/2002 | Srinivasan | |
| 2002/0120587 A1 | 8/2002 | D'Agostino | |
| 2002/0133467 A1 | 9/2002 | Hobson et al. | |
| 2002/0161701 A1 | 10/2002 | Warmack | |
| 2002/0174030 A1 | 11/2002 | Praisner et al. | |
| 2003/0018567 A1 | 1/2003 | Flitcroft et al. | |
| 2003/0028481 A1 | 2/2003 | Flitcroft et al. | |
| 2003/0101145 A1 | 5/2003 | Fang et al. | |
| 2003/0110136 A1 | 6/2003 | Wells et al. | |
| 2003/0125969 A1 | 7/2003 | Kizer et al. | |
| 2004/0078328 A1 * | 4/2004 | Talbert et al. | 705/40 |
| 2004/0148254 A1 * | 7/2004 | Hauser | 705/39 |
| 2004/0210531 A1 | 10/2004 | Barron et al. | |
| 2004/0230536 A1 * | 11/2004 | Fung et al. | 705/64 |
| 2005/0240522 A1 * | 10/2005 | Kranzley et al. | 705/40 |
| 2006/0206425 A1 | 9/2006 | Sharma | |

FOREIGN PATENT DOCUMENTS

| | | |
|---|---|---|
| EP | 0745961 | 12/1996 |
| EP | 1 029 311 B1 | 6/2001 |
| EP | 1 115 095 A2 | 7/2001 |
| JP | 10143556 | 5/1998 |
| WO | WO9930294 | 6/1999 |
| WO | WO 99/49424 A1 | 9/1999 |
| WO | WO 00/49586 | 8/2000 |
| WO | WO 00/62259 A1 | 10/2000 |
| WO | WO 01/29637 A2 | 4/2001 |
| WO | WO03069531 | 8/2003 |

OTHER PUBLICATIONS

Phillips, Stephen—"Case Study—Orbiscom and Cyota", Sep. 5, 2001, download from http://specials.ft.com/ftit/sept2001/FT3D4SI86RC.html on Mar. 26, 2009, © 2001, The Financial Times.
Notice of Allowance; U.S. Appl. No. 08/957,419; Jun. 29, 1999.
Notice of Allowance; U.S. Appl. No. 09/276,289; Jan. 12, 2000.
Notice of Allowance; U.S. Appl. No. 09/276,289; Feb. 22, 2001.
Notice of Allowance; U.S. Appl. No. 10/064,151; Nov. 26, 2004.
Notice of Allowance; U.S. Appl. No. 11/005,593; Oct. 3, 2006.
Notice of Allowance; U.S. Appl. No. 10/801,765; Jun. 25, 2008.

* cited by examiner

METHOD AND SYSTEM FOR COMPLETING TRANSACTIONS INVOLVING PARTIAL SHIPMENTS

CROSS-REFERENCE TO RELATED APPLICATION

This application is a continuation-in-part of, and claims benefit of and priority to, U.S. patent application Ser. No. 10/064,151 filed Jun. 14, 2002, now U.S. Pat. No. 6,901,387 entitled "Electronic Purchasing Method and Apparatus for Performing the Same", which is based on, and claims priority under 35 U.S.C. §119 to U.S. Provisional Patent Application Ser. No. 60/337,910 entitled "Electronic Purchasing Card", filed Dec. 7, 2001, the contents of which are incorporated herein by reference in their entirety for all purposes.

FIELD

The present invention relates generally to financial data processing techniques. More particularly, embodiments of the present invention relate to transaction authorization techniques associated with partial shipments.

BACKGROUND

Payment cards, such as credit cards and debit cards, are increasingly used in financial transactions. They are particularly widely used in consumer transactions, and are increasingly used in business-to-business transactions. Payment card transactions are simple and efficient: a buyer (referred to herein as a "client") provides a supplier (referred to herein as a "merchant") with an account identifier associated with a payment card to purchase desired item(s). Often, when the client is a business, the payment card and the transaction are associated with a purchase order identifying a number of items to be purchased. In some transactions, the client may desire to provide only a single account identifier to a merchant to purchase all of the items associated with a purchase order. Unfortunately, this can complicate matters for the merchant because the merchant may or may not be allowed to break the order into pieces for separate payment authorization and shipment.

For fraud and loss control purposes, some issuer financial institutions ("issuers") and bankcard associations (such as, e.g., MasterCard International, Inc. and Visa International Service Association) generally require that an authorization request not be submitted for a transaction until goods associated with the transaction are available.

This can lead to problems in situations where only a portion of the goods to be purchased by a customer are available. A merchant may not be able to secure a payment card authorization until the remaining goods are available, leading to problems for merchants that closely manage inventory, fulfill from different fulfillment centers, or otherwise need to split orders into batches for fulfillment.

It would be desirable to provide systems and methods that allow an order to be associated with a single payment card number or identifier and that allow a merchant to split the order into multiple pieces (each, a "partial shipment") and to receive an authorization for each of the partial shipments. Further, it would be desirable to provide systems and methods that allow the multiple authorizations to be made against the single account in quick succession or even substantially simultaneously. It would be further desirable to provide such partial shipments in conjunction with pre-authorization controls such as described in U.S. Pat. Nos. 5,991,750, and 6,226,624 each of which are currently assigned to the assignee of the present application (and referred to generally herein as the "GECF Pre-Authorization Patents"), the contents of each of which are incorporated by reference herein in their entirety for all purposes.

SUMMARY

Embodiments provide systems, apparatus, methods, computer program code, and means for completing transactions involving partial shipments. Pursuant to some embodiments, systems, apparatus, methods, computer program code, and means include receiving an initial authorization request, the initial authorization request including information identifying a transaction including information identifying a merchant, an account identifier and a transaction amount; identifying a pre-authorization record associated with the account identifier and determining that the transaction amount complies with authorization criteria in the pre-authorization record; transmitting an authorization message to the merchant; and analyzing the transaction information to determine if the transaction involves a partial shipment.

Pursuant to some embodiments, if the analysis indicates that the transaction involves a partial shipment, a new pre-authorization record is caused to be established for the account identifier, the new pre-authorization record including a new pre-authorized amount approximately equal to the pre-authorized amount minus the transaction amount identified in said initial authorization request.

BRIEF DESCRIPTION OF DRAWINGS

Further aspects of features of some embodiments will be more readily appreciated upon review of the detailed description of the preferred embodiments included below when taken in conjunction with the accompanying drawings, of which.

DETAILED DESCRIPTION

Embodiments provide systems and methods that allow merchants to quickly and efficiently fulfill a customer order through two or more partial shipments while receiving a financial authorization for each partial shipment. Each of the shipments may be associated with the same account identifier and may be individually authorized by an issuer (or an agent of the issuer) of the financial account identified by the account identifier. In some embodiments, the account identifier may be associated with further authorization controls (such as a pre-authorization record) that is updated or modified with each partial shipment.

For convenience, a number of terms are used herein. For example, as used herein, the term "account identifier" is used to refer to an alphanumeric string used to identify a financial account such as payment card account against which funds may be charged or debited when the account identifier is presented for payment by a holder (or authorized user) of the account. In some embodiments, an account identifier is a credit or debit card account identifier which may be, for example, formatted in a manner that allows the issuer of the account to be identified and which may be routed over existing payment card networks. For example, the account identifier may be a 16-digit MasterCard® formatted account identifier, a 15-digit American Express® formatted account identifier, etc., each of which includes a "bank identification number" or "BIN" that allows the issuer of the account to be identified.

Pursuant to some embodiments, individual account identifiers may be associated with a "pre-authorization record" (or, put another way, account identifiers may be "pre-authorized".) The term "pre-authorized" or "pre-authorization record" are generally used herein to refer to data associated with an account identifier which specifies the conditions in which a transaction associated with the account will be authorized. Details of some systems and methods implementing such conditions are set forth in the GECF Pre-Authorization Patents referenced above.

Pursuant to some embodiments, account identifiers are limited use account identifiers individually allocated to a client for use in conducting a transaction. For example, in some embodiments, limited use account identifiers may be issued and managed as described in commonly-assigned and co-pending U.S. patent application Ser. No. 10/391,689 the contents of which are incorporated herein in their entirety for all purposes. Those skilled in the art, upon reading this disclosure, will appreciate that other systems and methods for issuing limited use account identifiers may also be utilized in conjunction with features of the present invention.

As used herein, the term "client" is used to refer to an individual or entity (such as a corporation or other purchasing entity) which is authorized to use, or has been issued, an account identifier. Pursuant to some embodiments, a client (or an authorized representative of the client, such as an account manager) interacts with an account issuer or other entity to establish a pre-authorization record associated with the account identifier. The pre-authorization record is used to provide additional transaction controls to ensure that the account identifier is used in a particular manner. In some embodiments, where limited use account identifiers are used, the client (or an authorized representative of the client) may interact with the issuer or other entity to request a limited use account identifier and to associate the limited use account identifier with a particular transaction. For the purposes of this disclosure, unless otherwise noted, "limited use account identifiers" and "account identifiers" will be referred to as "account identifiers".

The client presents the account identifier to a merchant for use in purchasing goods or services from the merchant. In some embodiments, the presentation of an account identifier to a merchant is performed in an automated or semi-automated process (e.g., when the client operates procurement software or systems that are capable of interacting with merchant sales or catalog software systems). In some embodiments, the presentation of an account identifier to a merchant is performed in a manual or semi-automated process (e.g., a client may present a physical payment card having the account identifier encoded or embossed on it to the merchant, etc.).

Features of embodiments will now be described by first referring to FIG. 1 in which a transaction system 100 is shown. As shown, transaction system 100 includes interaction between a client 104 wishing to purchase goods or services from a merchant 108 using an account identifier identifying a payment card account associated with an issuer and/or issuer agent 106. Issuer and/or issuer agent 106 may operate or be in communication with a partial shipment module 110 and, in some embodiments, with a pre-authorization module 112. As depicted, for the purpose of illustration, transaction system 100 shows a single client, a single merchant, etc. interacting to complete a purchase transaction. Those skilled in the art will recognize that transaction system 100 may have a number of participants. For example, one or more issuer(s) 106 may issue accounts to a number of clients 104. Each client 104 may purchase goods or services from one or more merchant(s) 108. Each issuer 106 may interact with one or more partial shipment module(s) and pre-authorization module(s) 110, 112.

In general, as will be discussed further below, the entities, devices and systems of transaction system 100 interact to allow merchant 108 to fulfill an order received from client 104 in one or more partial shipments. More particularly, embodiments allow merchant 108 to submit a number of authorization requests (e.g., one for each partial shipment) associated with the same account identifier received from the client. As will be discussed, multiple authorization requests for a single account identifier may be submitted in a relatively short time period (e.g., in some embodiments, multiple authorization requests may be submitted substantially at the same time), allowing merchant 108 to fulfill an order from multiple fulfillment locations (and/or at multiple times) without concern of whether the authorizations will be declined because they are submitted substantially at the same time.

Client 104 may include a client device operated by or on behalf of a client to initiate a purchase transaction with merchant 108. For example, a client device may include a computing device, such as a personal computer, a workstation, a network terminal, a network server, a hand-held remote access device, a personal digital assistant (PDA) or any other device or combination of devices that can perform functions allowing client 104 to interact and operate as described herein. Merchant 108 may operate a similar device. Further, merchant 108 may operate one or more servers configured to perform sales operations and to interact with client 104 and issuers as described herein.

Issuer 106 may include one or more issuer devices such as one or more servers or other computing devices configured to perform the functions of a payment card issuer and the functions described herein. For example, issuer 106 may be an issuer processor, such as Total Systems Services, Inc. of Columbus, Ga. In some embodiments, issuer 106 may receive transaction information directly from merchant 108. Those skilled in the art will appreciate that in some embodiments, issuer 106 receives transaction information through an intermediary such as an acquirer or merchant acquirer (not shown). Transaction information may be routed to issuer 106 using information contained in (or associated with) the account identifier presented to the merchant for payment.

Figure 1:
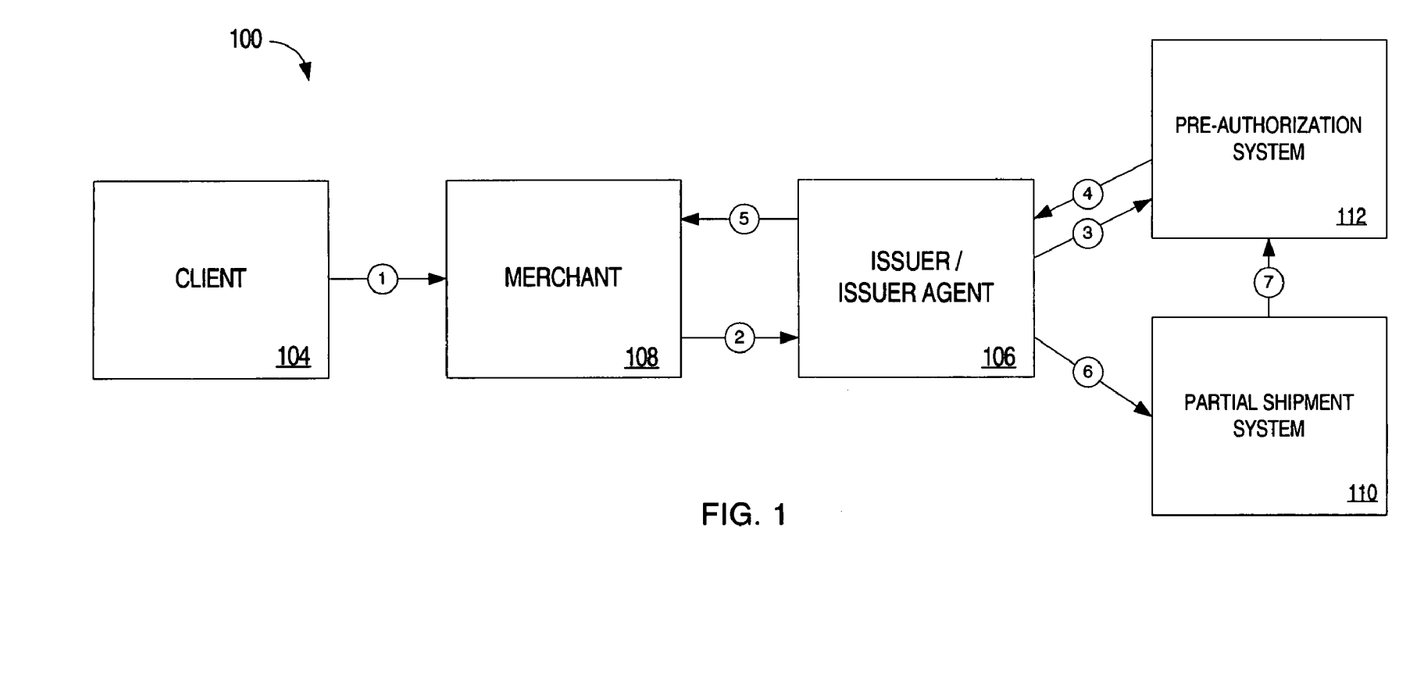
FIG. 1 is a schematic diagram of an exemplary system for use with the present invention.

Each of the entities, devices and systems of FIG. 1 may communicate over one or more communication networks, such as, for example, local area networks (LANs), wide-area networks (WANs), intranets, the Internet, an extranet, a wireless network, or any other form of computer network. Some interactions may be performed over existing bankcard networks such as the bankcard networks established and operated by or on behalf of MasterCard® or Visa International Service Association®. Different networks may be involved in different portions of a purchase transaction. As an illustrative example, in an illustrative transaction, client 104 may interact with merchant 108 over the Internet to place an order and to provide merchant 108 with an account identifier associated with an account of the client.

As an example, merchant 108 may use a bankcard network to submit an authorization request to the issuer of the account (and may receive an authorization response over the same network). The bankcard network may route the authorization request (and response) through one or more intermediaries (such as through a merchant or acquirer processor) to the issuer. Issuer 106 (or agent of the issuer) may submit authorization information to partial shipment module 110 through an intranet or LAN and partial shipment module 110 may submit partial shipment information to pre-authorization module 112 through the same intranet or LAN. These network examples are provided for illustrative purposes only; those skilled in the art, upon reading this disclosure, will recognize that other networks and combinations of networks may be used to facilitate interaction between participants of a transaction pursuant to the present invention.

Further details of a transaction pursuant to some embodiments will now be described. Certain interactions between participants of transaction system 100 are labeled in FIG. 1 as items "1" through "7", which will now be described generally in sequence. Those skilled in the art, upon reading this disclosure, will appreciate that some embodiments may involve additional interactions, some will involve fewer interactions and some will involve similar interactions in a different sequence. For the purpose of describing FIG. 1 and features of some embodiments, an illustrative example will first be described which will be referenced throughout the remainder of this description.

In the illustrative example, a purchasing manager employed by (or acting on behalf of) client 104 has created a purchase order (and received approval for the purchase order if needed) to purchase 10 computer systems from a computer merchant (merchant 108). Client 104 has been issued one or more payment card accounts by a financial institution (issuer 106). Issuer 106 is a financial institution or other entity that has implemented systems allowing account holders (such as client 104) to request the creation of pre-authorization records associated with individual account identifiers. For example, client 104 may specify one or more transaction conditions that must be met in order for a transaction involving the account identifier to be authorized.

In the illustrative example, client 104 has caused a pre-authorization record to be established and associated with the purchase order for 10 computer systems. The pre-authorization record may include conditions requiring that the transaction be performed before a specified expiration date and must be below a specified amount. Further, the pre-authorization record may specify that the transaction must be performed with the computer merchant. In the illustrative example, the pre-authorization record specifies that: the total pre-authorized amount is $10,000 ($1,000 for each computer system); the pre-authorization expires on Jan. 1, 2004 (two months after the purchase order was created); and the transaction must be performed with the computer merchant. If an authorization request is submitted to issuer 106 that does not comply with these pre-authorization conditions, the transaction will be declined.

As shown in FIG. 1, client 104 interacts with merchant 108 at "1". This interaction generally involves the client providing the merchant with an account identifier, and information identifying the proposed transaction. In some embodiments, this information may be provided to the merchant using automated, semi-automated, or even manual methods. For example, the client may transmit purchase requests to a merchant using a purchasing system that automatically transmits payment information and order information to the merchant. As another example, the client may simply contact the merchant via telephone or over the Internet to place an order and to provide an account identifier.

Merchant 108, upon receipt of the account identifier and transaction information, works to complete the transaction. In some embodiments, each of the items ordered may be available or ready to ship or otherwise available to associate with the transaction and the merchant may complete the transaction by submitting the account identifier and other transaction information to issuer 106 for authorization. However, in some situations, merchant 108 may determine that the proposed transaction is best completed in partial shipments. Pursuant to some embodiments, merchant 108 generates an authorization request that includes information about the partial shipment (e.g., including information identifying the price of the partial shipment, etc.) and also includes the account identifier provided by client 104.

This authorization request is transmitted to issuer 106 in the interaction labeled "2". As discussed above, the communication path between merchant 108 and issuer 106 may not be direct as shown, instead, it may involve one or more intermediaries operating to route the request to issuer 106 (or to an agent of issuer 106). Upon receipt of the authorization request, issuer 106 may identify the account identifier as having an associated pre-authorization record and act to confirm whether the transaction should be authorized (e.g., to confirm if the transaction details comply with the pre-authorization criteria established earlier).

The issuer may perform this confirmation by interacting with a pre-authorization module 112 via interactions "3" and "4". In some embodiments, pre-authorization module 112 is operated by issuer 106 and is an integrated portion of the issuer's authorization systems. In some embodiments, a third party operates pre-authorization module 112 and interactions "3" and "4" involve some external communications from issuer 106 to the third party. In either event, if the information transmitted to pre-authorization module 112 at "3" complies with the pre-authorization criteria associated with the account identifier, a reply "4" will include information allowing the issuer 106 to authorize the transaction (similarly, a replay "4" will include information requiring the issue to decline the transaction if the pre-authorization criteria are not satisfied).

The issuer 106 then generates an authorization reply message for transmission to the merchant (as interaction "5"). The reply message is an authorization approval if the pre-authorization criteria were satisfied, and a decline if the pre-authorization criteria were not satisfied. For example, if the computer merchant submitted an authorization request for $5,000 on Dec. 1, 2003, the transaction will be authorized (because the transaction amount is less than the pre-authorized amount and because the transaction date is before the expiration of the pre-authorization).

If the transaction is authorized, the merchant takes steps known in the art to complete the transaction (e.g., delivering the ordered items, submitting a settlement request for payment of the authorized amount, etc.).

Pursuant to embodiments of the present invention, issuer 106 (or an agent of issuer 106) also interacts with a partial shipment module 110 that operates on authorization information to identify if an authorized transaction involved a partial shipment. This interaction is shown as item "6" where authorization information is passed to partial shipment module 110. In some embodiments, partial shipment module 110 is operated by issuer 106 (or an agent of issuer 106), and interaction "6" is an internal message interaction. In some embodiments, module 110 is operated by a third party and interaction "6" may involve transmission of authorization information to the third party.

As will be described further below in conjunction with FIG. 2, partial shipment module 110 may include rules and other logic configured to identify whether particular authorizations involved partial shipments. If partial shipment module 110 identifies a particular authorization as having involved a partial shipment, module 110 interacts with pre-authorization module 112 to cause the pre-authorization record associated with the account identifier to be updated or renewed with new information reflecting the partial shipment. Further details of this interaction will be provided further below in conjunction with FIG. 2. In the illustrative example, partial shipment module 110 will identify the $5,000 authorization as a partial shipment and may cause pre-authorization module 112 to create a new or updated pre-authorization record with a pre-authorized transaction amount of the remaining $5,000.

Systems configured generally as shown in FIG. 1 allow merchant 108 to submit multiple, near-simultaneous authorization requests (based on the same account identifier) for multiple partial shipments, and allows issuer 106 to quickly and accurately respond to each request while still allowing pre-authorization controls to be associated with the account identifier.

Figure 2:
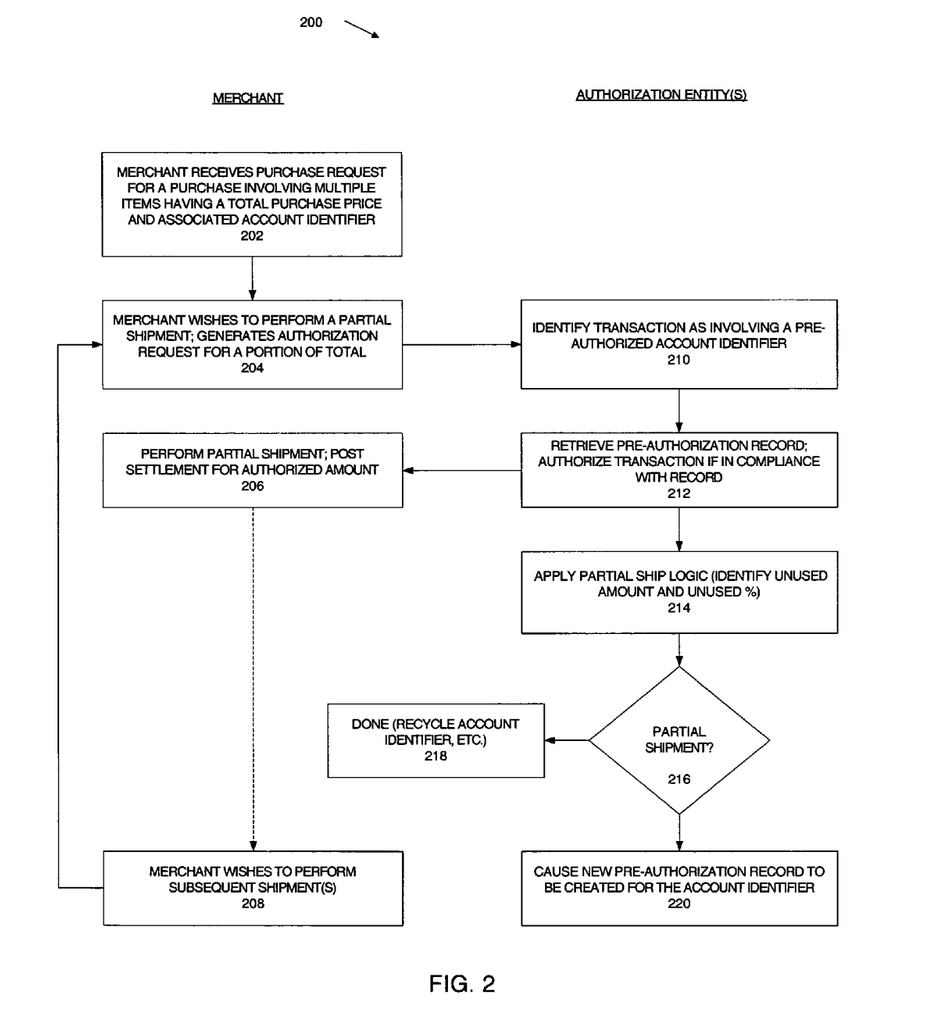
FIG. 2 is a flowchart depicting an exemplary process for performing partial shipments pursuant to some embodiments.

Reference will now be made to FIG. 2, where a process 200 is shown which involves processing by a merchant (such as a merchant 108 as described above) and by one or more authorization entities (e.g., such as one or more of an issuer 106 or issuer agent acting in conjunction with pre-authorization module 112 and partial shipment module 110 as described above). Process 200 may be performed after an account identifier has been issued to a client and has been pre-authorized for use in a particular transaction.

For the purpose of illustrating features of some embodiments, the illustrative example introduced above will be continued. As introduced above, a purchasing manager employed by client 104 has successfully created a purchase order to purchase 10 computer systems from a computer merchant 108. The total pre-authorized amount associated with the purchase order is $10,000 (each computer system costs $1,000). A single account identifier is associated with the purchase order, and the account identifier is associated with a pre-authorization record that pre-authorizes the transaction (e.g., specifying pre-authorization criteria including the identity of the merchant, the amount, and an expiration date of the identifier). The account identifier, and the purchase order (or details thereof), are communicated to the computer merchant 108, and processing begins at 202.

Processing at 202 includes the receipt, by a merchant, of a purchase request for a purchase involving multiple items having a total purchase price and having an associated account identifier provided to allow the merchant to charge the purchase price to a payment account associated with the account identifier. In the example, processing at 202 includes the computer merchant 108 receiving details of the purchase order for 10 computer systems for $10,000. The computer merchant 108 also receives information identifying the account identifier associated with the purchase order (which is associated with a pre-authorization record specifying the pre-authorization criteria associated with the transaction).

Processing continues at 204 where the merchant determines that it wishes to perform a partial shipment and generates an authorization request for a portion of the total. In the illustrative example, the computer merchant 108 may determine that it only has two computer systems currently available, and that other systems will become available in the near future. To begin satisfying the purchase order, the computer merchant 108 may determine that it desires to ship the first two systems. Processing at 204, in the example, includes generating an authorization request for $2,000 and submitting the authorization request, via the appropriate payment processing networks, to the issuer (or issuer processor) associated with the account identifier (referenced generically in FIG. 2 as the "authorization entity(s)" for simplicity and to acknowledge that one or more different entities may be involved in an authorization).

Different bankcard associations may have different rules regarding the information to be included in an authorization request, and different information may, accordingly, be transmitted in the request generated at 204. In general, however, a typical authorization request generated at 204 includes an identification of the merchant, an identification of the account identifier, and an identification of the transaction amount to be authorized.

This information is received by an authorizing entity at 210. The authorizing entity uses the information to identify the transaction as involving a pre-authorized account identifier (e.g., by performing a table look-up, by identifying a BIN or other information associated with the account identifier, etc.). Processing continues at 212 where the authorizing entity retrieves the pre-authorization record (or information) associated with the account identifier received in the authorization request. The transaction is authorized if the transaction information received in the authorization request is in compliance with the pre-authorization criteria in the pre-authorization record. In the illustrative example, the authorization request for $2,000 will be authorized if the authorization request is from the correct merchant and is received prior to the expiration date of the account identifier (and prior to the expiration date of the pre-authorization record associated with the account identifier). The authorization approval is transmitted to the merchant at 206.

Processing at 206 includes receiving the authorization approval and performing the partial shipment (e.g., in the example, by delivering the two computer systems to the customer). The merchant then posts settlement information based on the authorized amount. Processing generally continues at 214 where the authorization entity(s) apply partial ship logic to determine if the transaction authorized at 212 was a partial shipment. In some embodiments, processing at 214 may include first determining the difference between the original pre-authorized amount and the authorized amount. In the example, processing at 214 may include determining that out of a total pre-authorized amount of $10,000, only $2,000 was authorized, leaving an unused amount of $8,000. In some embodiments, processing at 214 may also include identifying the unused amount as a percentage of the total (in the example, 80% remains unused).

In some embodiments, processing at 214 may also include identifying a particular set of client rules associated with the account identifier. For example, in some embodiments, each client may establish or otherwise specify one or more sets of rules defining how some (or all) partial shipments should be handled. In such embodiments, processing at 214 may include identifying the client (e.g., based on the BIN and/or other information contained in the account identifier) and then identifying the client's partial shipment rules. In some embodiments, a client may specify rules that apply in certain situations and adopt generic rules in other situations. As a specific illustrative example, one client may establish a rule which specifies that a transaction involving one of its account identifiers is to be considered a "partial shipment" if the unused amount of a pre-authorized amount is greater than or equal to 10% of the pre-authorized amount. For example, if a pre-authorization is set up for $100 and a transaction for $89 is authorized, the remaining unused amount of $11 will be considered sufficient to treat the transaction as involving a partial shipment.

A second client may establish a rule specifying that a transaction involving one of its account identifiers is to be considered a "partial shipment" if the unused amount of a pre-authorized amount is greater than or equal to 20% of the pre-authorized amount. Using the same example as above, a transaction for $89 (associated with a $100 pre-authorization) will not be considered to involve a "partial shipment" (because the unused amount is less than 20% of the pre-authorized amount).

Those skilled in the art will appreciate that other partial shipment logic may also be used to identify and process authorizations involving partial shipments. For example, a party (such as the client) may specify that a partial shipment is one having an authorized amount which is less than or equal to a percentage of the total pre-authorized amount. As another example, a party may specify that a partial shipment is one having an authorized amount which is less than or equal to a percentage of the total pre-authorized amount, but which must be greater than a threshold amount. For example, the party may specify that if the difference between the authorized amount(s) and the pre-authorized amount is less than $x, that the account identifier will be closed and that no further transactions may be authorized against the account identifier. As yet another example, a party may specify that in no event will more than a pre-established number of partial shipments be associated with a single account identifier (e.g., a maximum of 10 partial shipments may be specified). Those skilled in the art will appreciate that other techniques and rules may be established to identify transactions as involving partials. For example, while some illustrative rules have been described which identify partials based on the unused amount, other rules may be established which identify partials based on the portion of the pre-authorized amount which has been used.

Processing continues at 216 where a determination is made whether the transaction authorized at 212 was a partial shipment. This determination may be made based on the percentage amount, the unused amount, or other criteria. In some embodiments, the shipment is a partial shipment if the percentage amount unused is greater than a threshold amount specified by an issuer of the account identifier (which may be specified by the issuer in conjunction with one or more merchants and/or one or more customers). In the illustrative example, the issuer (or the client associated with the account identifier) may have specified that any unused percentage that is greater than 15% is deemed to be a partial shipment. The illustrative example will, thus, be deemed to be a partial shipment, and processing will continue at 220. Those skilled in the art will appreciate that the threshold may be selected to accommodate variations in price, shipping, etc. If processing at 216 indicates that the shipment was not a partial shipment, processing will continue at 218 where the transaction is complete and no further transactions associated with the account identifier and the pre-authorization will be authorized. In some embodiments, the account identifier may need to be recycled to make it available for further use (e.g., in embodiments using techniques as described in co-pending patent application Ser. No. 10/391,689 referenced above).

Where the shipment is a partial shipment, processing continues at 220 where the authorization entity(s) act to cause a new pre-authorization record to be created for the account identifier. This may be performed in a number of ways. For example, in some embodiments, the authorization entity is the account issuer or an issuer processor or other agent acting on behalf of the issuer and the entity has responsibility for managing pre-authorization records as described herein. In such an embodiment, the issuer (or the issuer processor) is able to cause the creation of a new pre-authorization record and does so at 220. In some embodiments, the new pre-authorization record is created using some of the same information as the original pre-authorization record (e.g., such as the same expiration date, the same merchant identifier, etc.), and some new information (e.g., such as a new start date equal to the current date, and a new pre-authorized amount which is equal to the unused amount calculated at 214). In some embodiments, the client (or an issuer or other entity) may specify that the expiration date of the new pre-authorization record is different than the expiration date of the original pre-authorization record. For example, a client may specify that a new pre-authorization record which is created based on a partial shipment will have an expiration date that expires a period of time after the original expiration date or a period of time after a partial authorization is received. As a specific example, a client may specify that all new pre-authorization records created based on partial shipments have an expiration date which is five (5) days later than the original expiration date. In this manner, clients can ensure that all partial shipments are fully completed prior to the expiration date of a pre-authorization record.

Once this new pre-authorization record is established, the merchant can submit an additional authorization request for a further partial shipment associated with the purchase order and the account identifier (or for a final shipment to complete the purchase order).

In some embodiments, processing at 220 may involve interaction between several entities such as an issuer (or issuer processor) and an entity operating an account management system or other systems used to manage pre-authorizations and/or the use of account identifiers. For example, in some embodiments, responsibility for authorizing the creation of a new pre-authorization record may be vested in an entity other than the issuer or issuer processor. That is, (referring to FIG. 1), a separate entity may operate some or all of the functions associated with pre-authorization module 112. In such embodiments, processing at 220 may include the generation and transmission of a request message from the issuer (or issuer processor) to the entity responsible for authorizing the creation of a new record. If appropriate, the entity will authorize the creation and the new pre-authorization record will be created as described above.

In the illustrative example, a new pre-authorization record associated with the account identifier will be established with criteria specifying that the identifier may be used for transactions at the computer merchant for amounts up to $8,000 (up until an expiration date). Merchant processing may continue at 208 where the merchant determines when it wishes to perform subsequent shipment(s) and where processing loops back to the point where the merchant generates an authorization request.

In this manner, embodiments allow merchants to submit partial shipments in transactions that enjoy the purchasing controls of pre-authorized account identifiers. Merchants who often ship in partial shipments, and merchants who ship from multiple locations are able to efficiently and accurately use features of the present invention. By utilizing information from authorization requests, embodiments allow new pre-authorizations to be quickly established (in seconds or even fractions of a second) allowing merchants to satisfy orders through partial shipments completed from multiple merchant locations. In the illustrative example, the computer merchant may submit an authorization request for the first two computer systems at 12:01 pm from a first location, receive authorization, and then submit a second authorization request for the remaining systems at 12:02 pm from a second location. Each transaction, pursuant to embodiments described herein, may be authorized and charged to the same account identifier having pre-authorization controls as described herein. Embodiments reduce processing time, backoffice processing, returns, and customer service interventions, thereby resulting in improved efficiency and reduced cost.

As a still further example, embodiments allow the near simultaneous processing of multiple authorizations associated with a single account identifier. The computer merchant in the illustrative example may cause portions of a total order to be fulfilled from different locations. The computers may be fulfilled at one location, associated software from another, and peripherals from a third location. When the customer provides the account identifier to the computer merchant, the computer merchant may immediately (and automatically, for example), split the transaction into three separate fulfillment requests. Each fulfillment request may cause an authorization request to be submitted to an issuer or issuer processor at substantially the same time (for different portions of the same overall transaction). Embodiments allow such partial shipments to be processed and authorized quickly and efficiently.

Further, pursuant to some embodiments, detailed transaction information about each of the partial shipments may be provided to the client for their records. For example, in some embodiments, an account summary may be provided which includes both the settlement information for each partial shipment as well as information identifying the account identifier used and the detailed transaction information which was provided to create each pre-authorization record. As a specific illustrative example, continuing the computer purchase example introduced above, client 104 may receive a detailed statement or account summary which identifies the account identifier and each of the partial transactions (in the example, this may include information specifying the first partial transaction of $2,000 performed at a first time, and a second partial transaction of $8,000 performed at a second time). Further, the account summary may also include the detailed transaction information from the purchase order (in the example, this may include information specifying the 10 computer systems). This information may, in some embodiments, be provided to the client in a form which may be used to update the client's general ledger or other accounting systems, thereby allowing the client to easily and efficiently reconcile transactions.

Although the invention has been described in detail in the foregoing embodiments, it is to be understood that the descriptions have been provided for purposes of illustration only and that other variations both in form and detail can be made thereupon by those skilled in the art without departing from the spirit and scope of the invention, which is defined solely by the appended claims.

What is claimed is:

1. A method, comprising:
    receiving using a computer, at a financial account issuer, an initial authorization request, said initial authorization request including transaction information identifying a transaction including merchant information, an account identifier corresponding to a said financial account, and a transaction amount;
    identifying, using said computer, a pre-authorization record associated with said account identifier and corresponding to a predetermined purchase transaction;
    determining, using said computer, that said transaction information complies with authorization criteria including a pre-authorized amount in said pre-authorization record and said merchant information related to a merchant;
    facilitating, using said computer, communicating an authorization message from said financial account issuer to said merchant;
    determining, using said computer, based on said transaction information, that said transaction involves a partial shipment; and,
    in response to said transaction involving said partial shipment:
        calculating, using said computer, a new pre-authorized amount based upon a predetermined rule comprising reducing said pre-authorized amount by at least a portion of said transaction amount;
        using said computer, at least one of: updating said pre-authorization record with said new pre-authorized amount or creating a new pre-authorization record comprising said new pre-authorized amount.

2. The method of claim 1, wherein said determining that said transaction involves said partial shipment further comprises determining an amount of said pre-authorized amount that is unused.

3. The method of claim 1, wherein said determining that said transaction involves said partial shipment further comprises calculating a percentage of said pre-authorized amount that is unused.

4. The method of claim 3, wherein said determining that said transaction involves said partial shipment indicates that said transaction involves said partial shipment in response to said percentage that is unused being greater than a threshold percentage associated with said account identifier.

5. The method of claim 1, wherein said determining that said transaction involves said partial shipment further comprises:
    identifying a client associated with said account identifier;
    identifying at least a first partial shipment rule specified by said client; and
    applying said at least a first partial shipment rule to said transaction information to determine that said transaction involves said partial shipment.

6. The method of claim 1, wherein said determining that said transaction involves said partial shipment further comprises determining that a maximum number of partial shipments has been exceeded.

7. The method of claim 2, wherein said determining that said transaction involves said partial shipment further comprises comparing at least one of said amount that is unused or said transaction amount to a threshold amount.

8. The method of claim 1, wherein said predetermined rule comprises setting said new pre-authorized amount approximately equal to said pre-authorized amount minus said transaction amount identified in said initial authorization request.

9. The method of claim 8, further comprising transmitting a request to a pre-authorization system in order to at least one of: modify a pre-existing authorization message or establish a new pre-authorization message.

10. The method of claim 8, further comprising:
    receiving a subsequent authorization request from said merchant, said subsequent authorization request including subsequent transaction information including said account identifier and a subsequent transaction amount;
    identifying at least one of: said updated pre-authorization record or said new pre-authorization record associated with said account identifier and determining that said subsequent transaction amount is less than said new pre-authorized amount; and
    transmitting a subsequent authorization message to said merchant.

11. The method of claim 10, further comprising:
    prior to said transmitting said authorization message, determining that said subsequent transaction is prior to an expiration date associated with said new pre-authorization record.

12. The method of claim 10, wherein said subsequent authorization request further includes merchant information, further comprising:
    prior to said transmitting said authorization message, comparing said merchant information with information in at least one of: said updated pre-authorization record or said new pre-authorization record.

13. The method of claim 10, further comprising:
    determining, based on said subsequent transaction information, that said subsequent transaction involves a partial shipment.

14. The method of claim 1, further comprising:
    identifying a start date and an expiration date for at least one of: said updated pre-authorization record or said new pre-authorization record.

15. The method of claim 14, wherein said start date is a date of creation of at least one of: said updated pre-authorization record or said new pre-authorization record.

16. The method of claim 14, wherein said expiration date is the same as an expiration date of said pre-authorization record associated with said account identifier.

17. The method of claim 14, wherein said expiration date is a period of days after an expiration date of said pre-authorization record associated with said account identifier.

18. The method of claim 17, wherein a length of said period is specified by a client associated with said account identifier.

19. The method of claim 1, further comprising:
replicating expiration date information and a merchant identifier from said pre-authorization record in said new pre-authorization record.

20. An apparatus, comprising:
a processor;
a communication device, receiving, at a financial account issuer, an initial authorization request from a merchant; and
a memory in operative communication with said processor, said memory for storing a plurality of processing instructions enabling said processor to:
identify a pre-authorization record associated with said account identifier and corresponding to a predetermined purchase transaction;
determine that said transaction information complies with authorization criteria including a pre-authorized amount in said pre-authorization record and said merchant information related to a merchant;
cause an authorization message to be transmitted from said financial account issuer to said merchant;
determine, based on said transaction information, that said transaction involves a partial shipment; and,
in response to said transaction involving said partial shipment:
calculate, using said computer, a new pre-authorized amount based upon a predetermined rule comprising said pre-authorized amount reduced by at least a portion of said transaction amount;
at least one of: update said pre-authorization record or create a new pre-authorization record to include said new pre-authorized amount.

21. A computer readable medium encoded with processing instructions for implementing a method, performed by a computer, said method comprising:
receiving at a financial account issuer, an initial authorization request, said initial authorization request including transaction information identifying a transaction including merchant information, an account identifier corresponding to a said financial account, and a transaction amount;
identifying a pre-authorization record associated with said account identifier and corresponding to a predetermined purchase transaction;
determining that said transaction information complies with authorization criteria including a pre-authorized amount in said pre-authorization record and said merchant information related to a merchant;
facilitating communicating an authorization message from said financial account issuer to said merchant;
determining, based on said transaction information, that said transaction involves a partial shipment; and,
in response to said transaction involving said partial shipment:
calculating a new pre-authorized amount based upon a predetermined rule comprising said pre-authorized amount reduced by at least a portion of said transaction amount; and
at least one of: updating said pre-authorization record with said new pre-authorized amount or creating a new pre-authorization record to include said new pre-authorized amount.

22. The method of claim 1, wherein said at least one of: updating said pre-authorization record or creating a new pre-authorization record is in response to said transaction amount being at least one of: equal to or above a predetermined transaction value.

23. A method, comprising:
receiving, at a financial account issuer computer, a pre-authorization request from a client, wherein said pre-authorization request comprises merchant information, an account identifier corresponding to a financial account associated with said client and issued by said financial account issuer, and a pre-approval amount request;
creating, using said computer, a pre-authorization record corresponding to said pre-authorization request, wherein said pre-authorization record comprises authorization criteria comprising said account identifier corresponding to said financial account, merchant information and a pre-authorized amount;
receiving, using said computer, an initial authorization request from a merchant, said initial authorization request including transaction information identifying a transaction including merchant information, said account identifier corresponding to said financial account, and a transaction amount;
matching, using said computer, said pre-authorization record with said initial authorization request;
determining, using said computer, that said transaction amount complies with said authorization criteria;
transmitting, using said computer, an authorization message to said merchant;
determining, using said computer, based on said transaction information and said pre-authorization record, that said transaction involves a partial shipment; in response to said transaction involving said partial shipment:
calculating, using said computer, a new pre-authorized amount based upon a predetermined rule comprising reducing said pre-authorized amount by at least a portion of said transaction amount; and,
using said computer, at least one of: updating said pre-authorization record or creating a new pre-authorization record in response to said transaction involving said partial shipment.

* * * * *